Patented Jan. 30, 1940

2,188,332

UNITED STATES PATENT OFFICE 2,188,332

FLEXIBLE COATED ARTICLE

Wallace H. Carothers, Wilmington, Del., assignor to E. I. du Pont de Nemours & Company, Wilmington, Del., a corporation of Delaware No Drawing. Application February 15, 1937, Serial No. 125,889

11 Claims. (Cl. 91—68)

This invention relates to the art of coating and more particularly to new and improved flexible coated articles.

This application is a continuation-in-part of my Patent Number 2,071,250.

Various coating and film-forming materials have heretofore been investigated and suggested in the manufacture of flexible coated products wherein the coating is applied to materials such as cloth, paper, metal, etc. Among the coating materials previously tried there may be mentioned cellulose acetate, pyroxylin, and polymers of acrylic acid derivatives. However, in spite of the vast amount of work that has been done in this art, the best products are at the present time far from satisfactory. They are subject to many disadvantages a few of which are that upon ageing the coating becomes brittle, decomposes, and separates from the base. Furthermore, the relatively fragile nature of the coating composition requires such articles to be handled with extreme care particularly if they have been used for any considerable length of time.

An object of this invention is to prepare articles which overcome the aforementioned defects and combine both flexibility and durability. A further object is to modify the properties of flexible articles in order to improve their utility in various applications. A still further object is to coat flexible articles, particularly sheeted materials, such as paper, cloth, and leather, with an agent which adheres tenaciously thereto and which improves the strength, durability, and utility of said articles. Other objects will become apparent from the following description.

These objects are attained according to the present invention by treating a flexible base material of either organic or inorganic origin with a composition containing as a constituent thereof a synthetic linear condensation polymer of a novel type characterized by exceptionally high molecular weight and high intrinsic viscosity as defined below. In its preferred embodiment, this invention comprises the coating of flexible sheeted materials with a composition consisting primarily of a fiber-forming synthetic linear condensation polyamide.

The preferred coating carried by the flexible articles described herein comprises or consists of the linear condensation polymers described in the above mentioned application. These polymers can be formed into very useful objects, such as filaments, ribbons, films, and the like, which can be converted by suitable application of stress, referred to as "cold drawing", into oriented products of great utility, as for instance into strong fibers showing by characteristic X-ray patterns orientation along the fiber axis. Of this new class of materials the polyamides form a particularly valuable sub-class. Synthetic linear condensation polyamides are of two types: those derived from suitable diamine-dibasic acid mixtures or their equivalents, and those derived from polymerizable monoaminomonocarboxylic acids or their amide-forming derivatives. It will be noted that these polyamides are derived from bifunctional polyamide-forming reactants.

Since the preferred embodiment of this invention involves the use of synthetic linear condensation polyamides, the present invention will be described with particular reference to these polymers. While the properties of these synthetic polyamides will, of course, vary somewhat with the extent to which they have been polymerized and with the nature of the reactants used in their preparation, common characteristics of these products are high tenacity, both wet and dry; extraordinary resistance to solvents and chemical reagents; exceptional good elastic recovery; good dyeing properties; and good aging qualities. Although the polyamides are resistant to most chemical reagents, they are hydrolyzed by strong mineral acids yielding the monomeric polyamide-forming reactants from which they were derived. The polyamides are further characterized by high thermal stability. This is a valuable property since it permits the formation of films and the like directly from the molten polymer without the use of a solvent. This property also makes it possible to coat flexible articles with the molten polymer. The polyamides most useful in the present invention have melting points ranging from 100–300° C.

Reference has been made to the effect of the degree of polymerization on the properties of the polyamides. In general, the strength and toughness of the polyamide improve with increase in molecular weight. Although the exact molecular weight of the polyamides is difficult to determine, viscosity determinations furnish a convenient method for comparing the molecular weights of different polymers. As a rule, a synthetic linear condensation polyamide does not exhibit fiber-forming or film-forming properties unless it has an intrinsic viscosity of at least 0.4, where intrinsic viscosity is defined as $$\frac{\log_e \eta_r}{C}$$

where $\eta_r$ is the viscosity of a dilute meta-cresol solution of the polyamide divided by the viscosity of meta-cresol in the same units and at the some temperature and C is the concentration of the polyamide in grams per 100 cc. of solution. For the preparation of the coated flexible articles of this invention, it is desirable to use polyamides having an intrinsic viscosity above 0.6, polymers having an intrinsic viscosity between 0.8 and 2.0 being particularly useful.

Polyamide-coated flexible articles can be prepared in a number of ways. If the thermal stability of the flexible articles permits, the coating can be accomplished by applying hot molten polyamide directly to the article or by passing the article through a bath containing the molten polyamide. Metal screens, and certain types of threads, and sheeted materials, can be coated in this manner. Another convenient method for applying the coating consists in pressing a preformed film or sheet of the polyamide onto the flexible article, e. g., cloth, leather, paper, or the like, by means of heat and pressure. Still another method consists in applying a solution of the polyamide onto the flexible article and removing the solvent therefrom by means of evaporation or coagulating methods. If the flexible article is porous, considerable impregnation also takes place, particularly if the polyamide is applied in solution form. For certain purposes this impregnation is desirable.

Application of a solution of the polyamide to the flexible article has been mentioned as a method of preparing the products of this invention. For the most part, polyamides derived from straight chain (i. e., polymethylene) monoaminomonocarboxylic acids or from the reaction of straight chain diamines with straight chain dicarboxylic acids are relatively insoluble in the more common organic solvents but are soluble in phenols and usually in the lower members of the fatty acid series, such as formic and acetic. These solutions can be employed providing the article coated is non-reactive toward the solvent. Such polyamides yield coatings which are exceptionally resistant to oils, greases, most organic liquids, and water. Certain polyamides, however, are soluble in a wider range of solvents. Thus, polyamides prepared from diamines and dicarboxylic acids, one or both of which contain a hydrocarbon substituent in the chain of atoms separating the amide-forming groups, are soluble in alcohols. For example, the polyamide derived from hexamethylenediamine and beta-methyl adipic acid as well as the polyamide derived from 3-methyl hexamethylenediamine and adipic acid, are soluble in ethanol and butanol. Another class of polyamides which is soluble in a wider variety of solvents are the so-called interpolymers or copolymers, i. e., polymers derived from a mixture of polyamide-forming reactants. As an example of such an interpolymer may be mentioned a polyamide derived from a mixture of diamines with one or more dicarboxylic acids. Thus, the polyamide derived from a mixture of one mol of hexamethylenediamine, one mol of decamethylenediamine, one mol of adipic acid, and one mol of sebacic acid is soluble in hot ethanol and butanol, whereas polyamides, such as polyhexamethylene adipamide (derived from hexamethylenediamine and adipic acid) and polydecamethylene sebacamide are not soluble in alcohols. The interpolymers are further characterized by the fact that their melting points are less sharp and considerably lower than those of the corresponding simple polyamides. Moreover, the alcohol-soluble polyamides are more readily obtained in the form of clear films than the alcohol-insoluble polyamides. This is important when it is desired to have a clear transparent coating, e. g., in connection with the coating of screens to be used as glass substitutes.

The following examples illustrate the invention in greater detail:

*Example I*

A paper of low porosity prepared from a highly beaten wood pulp was coated on one side with a solution of 21 parts by weight of a polyamide interpolymer of intrinsic viscosity 1.05, derived from equimolecular amounts of hexamethylene diammonium adipate (hexamethylenediamine-adipic acid salt) and decamethylene diammonium sebacate, in 80 parts by weight of 98% formic acid and 60 parts by weight of ethylene chlorohydrin. The excess solution was removed by passing the paper under tension between two closely spaced rolls. The coated paper was dried 2 minutes at 110° C. The final product contained 6.4% polyamide based upon the paper.

When subjected to an accelerated greaseproof test the coated paper showed no visible penetration of a colored turpentine solution after 240 minutes' contact. Greased portions of this paper retained turpentine resistance many times better than standard grease-resistant papers of commerce. This test was carried out as follows: A sheet of white absorbent "tell-tale" paper was laid on a table top and on this was placed a section of the coated paper. On the latter a one inch square piece of a very absorbent white blotting paper about 0.05 inch in thickness was placed. To the blotting paper was added 0.4 cc. of turpentine containing 0.4% of an oil-soluble dye. A one inch cube of brass (weight—140 g.) was laid on top of the blotting paper. The time required for penetration, i. e., the time required to produce a colored spot on the "tell-tale" paper, was then observed.

*Example II*

A sheet of 0.0015 inch thickness prepared from the interpolymers mentioned in Example I was laid on a section of tanned goat skin from which the oil had been extracted by means of a hydrocarbon solvent. The polyamide sheet and the leather were then pressed together between tin platens at 125 lb./sq. in. pressure at 155° C. for two minutes. This caused the polyamide sheet to adhere tenaciously to the leather. The coated leather had a glossy surface and resembled patent leather in general appearance. The article withstood an unusual amount of bending and flexing without cracking. This was also true of leather coated with an alcohol solution of polyhexamethylene beta-methyl adipamide.

*Example III*

A 0.001 inch sheet of a polyamide of intrinsic viscosity 0.6 derived from diphenylolpropane diacetic acid and decamethylenediamine was pressed on a cotton broadcloth backing at 600 lb./sq. in. pressure at a temperature of 75° C. for one minute. The adhesion between the cloth and polyamide was unusually good. The product was flexible, was resistant to tearing, and was waterproof. The coating had a glassy transparency.

*Example IV*

A 25% solution of the fiber-forming interpolymer mentioned in Example I in formic acid was spread on an unsized cotton cloth by means of a doctor knife. The solvent was then removed by heating at 100° C. This produced a cloth which was both coated and impregnated with the polyamide, the final product consisting of about equal weights of cloth and polyamide. The product was less flexible than the original cloth but was sufficiently flexible to retain the characteristics of cloth. It was waterproof.

Although this invention has been described with particular reference to polyamides, it is applicable broadly to fiber-forming or film-forming synthetic linear condensation polymers. As examples of such polymers might be mentioned polyesters, polyacetals, polyethers, polyester-polyamides, and other copolymers.

It is to be understood that the aforementioned examples are illustrative merely of the manner of carrying out the practical application of this invention. As already indicated, the flexible bases which may be coated with the composition herein described may be of either organic or inorganic origin, porous or non-porous. As additional examples of such bases may be mentioned wire meshes, metal sheets, silk, artificial silk, wool, cotton, linen, rubber, leather, artificial leather, regenerated cellulose, teal, duck, various forms of paper, etc. The aforementioned and related flexible bases may be in the form of sheets, filaments, foils, yarns, fabrics, etc.

As indicated by the foregoing examples, numerous methods may be employed in applying the coating. The method most suitable for the preparation of a given product will depend on the composition and form of the flexible article and upon the nature of the polymeric material. When it is desired to apply a thick coating, it is generally advantageous to prepare the polymer in sheet form and attach it to the flexible article by application of heat and/or pressure, or by means of a suitable adhesive or cementing material. It is often desirable to subject the film used for this purpose to stress in one or more directions prior to its application to the flexible article in order to produce orientation therein. Thick coatings can also be obtained by using the polymer in solution and repeating the coating treatment.

As already indicated, the polyamides used in the preparation of the coated articles of this invention are synthetic linear condensation polymers capable of yielding fibers or films. A valuble class of these polyamides for use in this invention comprise those derived from diamines of formula $NH_2CH_2RCH_2NH_2$ and dicarboxylic acids of formula $HOOCCH_2R'CH_2COOH$ and amide-forming derivatives thereof, R and R' representing divalent hydrocarbon radicals free from olefinic and acetylenic unsaturation and R having a chain length of at least two carbon atoms. An especially valuable group of polyamides within this class are those in which R is $(CH_2)_x$ and R' is $(CH_2)_y$ wherein $x$ is at least two. As examples of polyamides which fall within one or both of these groups might be mentioned polytetramethylene adipamide, polytetramethylene sebacamide, polypentamethylene sebacamide, polyhexamethylene adipamide, polyhexamethylene sebacamide, polyhexamethylene beta-methyl adipamide, poly-3-methyl-hexamethylene adipamide, polyoctamethylene adipamide, polydecamethylene adipamide, polydecamethylene p-phenylene diacetamide, and poly-p-xylylene sebacamide, and particularly interpolymers derived from reactants of the types represented in these polymers. Polyamides derived from diamines and acids such as diphenylolpropane diacetic are also useful as coatings. Polyamides obtained from monoaminomonocarboxylic acids and their amide-forming derivatives may also be employed in the preparation of the coated articles. As examples of such polyamides might be mentioned those derived from 6-aminocaproic acid, 9-aminononanoic acid, and 11-aminoundecanoic acid. It is also within the scope of this invention to use a mixture of polyamides or interpolymers derived from a mixture of polyamide-forming reactants, e. g., a mixture of two or more diamines with one or more dicarboxylic acids or a mixture of a diamine, a dicarboxylic acid, and an amino acid. In fact, interpolymers because of their wider solubility are particularly useful in preparing the coated articles of this invention.

The invention is not limited to the coating of flexible articles with compositions consisting solely of synthetic linear condensation polyamides. Materials such as plasticizers, melting point depressors, e. g., o-hydroxydiphenyl and diphenylolpropane, pigments, extenders, fillers, dyes, resins, oils, cellulose derivatives, and the like may be present in addition to the polyamide. Wetting agents, textile assistants, etc. may also be present. If the foreign material is present in moderate amount it does not mask the desirable properties of the polyamide coating. Although the polyamides are quite flexible for certain purposes, it is sometimes advantageous to employ a plasticizer. A plasticizer frequently adds to the clarity of the coating and improves its adhesion to the article. If the flexible article to be coated is a metal screen to be used as a glass substitute, it is desirable that the coating be transparent to permit transmission of light, particularly ultra-violet light. The ultra-violet light transmitting properties of the polyamide is satisfactory for this purpose. On the other hand, if the coated article, e. g. paper or regenerated cellulose, is to be used as a wrapping material for food, it is desirable to add a substance which decreases the ultra-violet light transmission.

While the invention is directed broadly to coated flexible articles, it is of particular advantage in the production of coated sheeted materials of which paper, cloth, and leather, are typical examples. Polyamides are especially suitable for coating such materials since they are very flexible, show good adhesion, are durable, and exhibit exceptionally good resistance to greases, oils, most organic liquids, water, and vapors. Polyamides have unusually good elastic properties being much superior in this respect to cellulose derivatives and most resinous materials. This is a very important property in connection with coated materials, since the coating must be capable of withstanding the expansion and contraction of the article resulting from temperature changes, as well as the strains produced by bending the article, without separating therefrom. Furthermore, the polyamides are substantially insensitive to the elements; they do not become brittle on exposure to ordinary or extraordinary weather conditions and are therefore very durable. The polyamide coatings are unusually strong and for this reason the coated articles, particularly when the base is a relatively weak material like paper, are stronger than the uncoated articles. Furthermore, the polyamides are odorless. This is an important property in connection with articles to be used as wearing apparel or as containers for food.

Although coatings of certain plastic materials may possess some of the above mentioned properties of the coatings on the flexible articles described herein, no other product has been found which possesses these properties to the same high degree as the polyamides. It is surprising that the polyamides adhere so tenaciously to materials, such as cloth, paper, metal and the like, which differ so widely from the polyamides in chemical composition.

This invention provides a convenient method for improving the utility and durability of flexible articles. Articles so coated or sized have a wide variety of commercial uses. Thus, the coated paper of this invention is of utility as a wrapping material or as a container for oils and foodstuffs, since it is non-sticky, odorless, waterproof, oilproof, and greaseproof. Polyamide-coated cloth is useful in making shower curtains, window shades, washable table-cloths, raincoats, etc. The cloth can be washed without losing its coating or size. Leather substitutes can also be prepared according to this invention by coating a suitable fabric base with a polyamide. As already indicated, the coating of leather with polyamide yields a very satisfactory patent leather. Wire mesh coated with a continuous film of polyamide is a useful glass substitute, particularly where great strength is desired.

As many apparently widely different embodiments of this invention may be made without departing from the spirit and scope thereof, it is to be understood that I do not limit myself to the specific embodiments thereof except as defined in the appended claims.

I claim:

1. An article of manufacture which comprises flexible sheet material comprising a flexible fabric base and a synthetic linear condensation polymer, capable of being formed into fibers showing by characteristic X-ray patterns orientation along the fiber axis.

2. A waterproof and greaseproof flexible article of manufacture which comprises flexible sheet material comprising a fabric base coated with synthetic linear condensation polymer, capable of being formed into fibers showing by characteristic X-ray patterns orientation along the fiber axis.

3. The article set forth in claim 1 in which said polymer is a polyamide.

4. The article set forth in claim 1 in which said fabric is cloth and said polymer is a polyamide.

5. The article set forth in claim 1 in which said fabric base is paper and said polymer is a polyamide.

6. The article set forth in claim 1 in which said fabric base is leather and said polymer is a polyamide.

7. Window shade material comprising cloth carrying a coating of synthetic linear condensation polymer capable of being formed into fibers showing by characteristic X-ray patterns orientation along the fiber axis.

8. A leather substitute comprising a flexible fabric coated with synthetic linear condensation polymer capable of being formed into fibers showing by characteristic X-ray patterns orientation along the fiber axis.

9. A process for manufacturing coated flexible fabric sheet material which comprises applying to a flexible fabric base a film of molten synthetic linear condensation polymer capable of being formed into fibers showing by characteristic X-ray patterns orientation along the fiber axis.

10. A process for manufacturing coated flexible fabric sheet material which comprises applying to a flexible fabric base a preformed film of synthetic linear condensation polymer capable of being formed into fibers showing by characteristic X-ray patterns orientation along the fiber axis, and then bonding the film to said base by heat and pressure.

11. A leather substitute comprising a flexible fabric coated with synthetic linear polyamide capable of being formed into fibers showing by characteristic X-ray patterns orientation along the fiber axis.

WALLACE H. CAROTHERS.

---

CERTIFICATE OF CORRECTION.

Patent No. 2,188,332. January 30, 1940.

WALLACE H. CAROTHERS.

It is hereby certified that error appears in the printed specification of the above numbered patent requiring correction as follows: Page 2, first column, line 3, for the word "some" read same; line 75, for "polyamines" read polyamides; page 3, second column, line 70, for "the the" read the; and that the said Letters Patent should be read with this correction therein that the same may conform to the record of the case in the Patent Office.

Signed and sealed this 20th day of February, A. D. 1940.

(Seal)

Henry Van Arsdale,
Acting Commissioner of Patents.

CERTIFICATE OF CORRECTION.

Patent No. 2,188,332.   January 30, 1940.

WALLACE H. CAROTHERS.

It is hereby certified that error appears in the printed specification of the above numbered patent requiring correction as follows: Page 2, first column, line 3, for the word "some" read same; line 75, for "polyamines" read polyamides; page 3, second column, line 70, for "the the" read the; and that the said Letters Patent should be read with this correction therein that the same may conform to the record of the case in the Patent Office.

Signed and sealed this 20th day of February, A. D. 1940.

(Seal)

Henry Van Arsdale,
Acting Commissioner of Patents.